United States Patent
Kester et al.

(10) Patent No.: US 8,010,552 B2
(45) Date of Patent: *Aug. 30, 2011

(54) SYSTEM AND METHOD FOR ADAPTING AN INTERNET FILTER

(75) Inventors: Harold Kester, Cardiff, CA (US); Dan Ruskin, Poway, CA (US); Chris Lee, San Diego, CA (US); Mark Anderson, San Diego, CA (US)

(73) Assignee: Websense, Inc., San Diego, CA (US)

( * ) Notice: Subject to any disclaimer, the term of this patent is extended or adjusted under 35 U.S.C. 154(b) by 449 days.

This patent is subject to a terminal disclaimer.

(21) Appl. No.: 11/624,622

(22) Filed: Jan. 18, 2007

(65) Prior Publication Data
US 2007/0179950 A1 Aug. 2, 2007

Related U.S. Application Data

(63) Continuation of application No. 10/017,750, filed on Dec. 7, 2001, now Pat. No. 7,194,464.

(51) Int. Cl.
*G06F 7/00* (2006.01)
*G06F 17/30* (2006.01)
(52) U.S. Cl. .......... 707/769; 707/771; 709/229
(58) Field of Classification Search .......... 707/1–6; 709/229
See application file for complete search history.

(56) References Cited

U.S. PATENT DOCUMENTS

| | | |
|---|---|---|
| 4,423,414 A | 12/1983 | Bryant et al. |
| 4,734,036 A | 3/1988 | Kasha |
| 4,941,084 A | 7/1990 | Terada et al. |
| 5,408,642 A | 4/1995 | Mann |
| 5,493,692 A | 2/1996 | Theimer et al. |
| 5,541,911 A | 7/1996 | Nilakantan et al. |

(Continued)

FOREIGN PATENT DOCUMENTS

EP 0 658 837 A2 12/1994

(Continued)

OTHER PUBLICATIONS

Taketatsu, Open-Weight Division NT-LAN Lecture Search for an Ideal Work Environment the 3rd, INTEROP, Japan, SOFTBANK Publishing Inc., Sep. 1, 1999, the 9th volume, pp. 174-179.

(Continued)

*Primary Examiner* — Apu M Mofiz
*Assistant Examiner* — Cindy Nguyen
(74) *Attorney, Agent, or Firm* — Knobbe Martens Olson & Bear LLP (57) ABSTRACT

A system and method for updating a filtering system which controls access to a website/page between a local area network (LAN) and an Internet. The LAN includes an Internet gateway system coupled to a workstation and configured to receive a URL request. The system controls access to the website/page associated with the URL based on one or more categories that are associated with the URL. The Internet gateway system can determine the category that is associated with the URL by referencing a master database or requesting the category from a database factory. The database factory can receive URLs from multiple Internet gateway systems. The database factory determines whether the identifier was previously categorized by the database factory and provides the category to the Internet gateway system. Once the Internet gateway system has the category, it applies rules associated with the category and user to filter access to the requested website/page.

38 Claims, 6 Drawing Sheets

U.S. PATENT DOCUMENTS

| | | | |
|---|---|---|---|
| 5,548,729 A | 8/1996 | Akiyoshi et al. |
| 5,555,376 A | 9/1996 | Theimer et al. |
| 5,606,668 A | 2/1997 | Shwed |
| 5,678,041 A | 10/1997 | Baker et al. |
| 5,682,325 A | 10/1997 | Lightfoot et al. |
| 5,696,486 A | 12/1997 | Poliquin et al. |
| 5,696,898 A | 12/1997 | Baker et al. |
| 5,699,513 A | 12/1997 | Feigen et al. |
| 5,706,507 A | 1/1998 | Schloss |
| 5,758,257 A | 5/1998 | Herz et al. |
| 5,768,519 A | 6/1998 | Swift et al. |
| 5,774,668 A | 6/1998 | Choquier et al. |
| 5,787,253 A | 7/1998 | McCreery et al. |
| 5,787,427 A | 7/1998 | Benantar et al. |
| 5,799,002 A | 8/1998 | Krishnan |
| 5,801,747 A | 9/1998 | Bedard |
| 5,832,212 A | 11/1998 | Cragun et al. |
| 5,832,228 A | 11/1998 | Holden et al. |
| 5,832,503 A | 11/1998 | Malik et al. |
| 5,835,722 A | 11/1998 | Bradshaw et al. |
| 5,848,233 A | 12/1998 | Radia et al. |
| 5,848,412 A | 12/1998 | Rowland et al. |
| 5,850,523 A | 12/1998 | Gretta, Jr. |
| 5,855,020 A | 12/1998 | Kirsch |
| 5,864,683 A | 1/1999 | Boebert et al. |
| 5,884,325 A | 3/1999 | Bauer et al. |
| 5,889,958 A | 3/1999 | Willens |
| 5,892,905 A | 4/1999 | Brandt et al. |
| 5,896,502 A | 4/1999 | Shieh et al. |
| 5,899,995 A | 5/1999 | Millier et al. |
| 5,911,043 A | 6/1999 | Duffy et al. |
| 5,933,827 A | 8/1999 | Cole et al. |
| 5,941,947 A | 8/1999 | Brown et al. |
| 5,958,015 A | 9/1999 | Dascalu |
| 5,961,591 A | 10/1999 | Jones et al. |
| 5,963,941 A | 10/1999 | Hirakawa |
| 5,978,807 A | 11/1999 | Mano et al. |
| 5,983,270 A | 11/1999 | Abraham et al. |
| 5,987,606 A | 11/1999 | Cirasole et al. |
| 5,987,611 A | 11/1999 | Freund |
| 5,991,807 A | 11/1999 | Schmidt et al. |
| 5,996,011 A | 11/1999 | Humes |
| 5,999,929 A | 12/1999 | Goodman |
| 6,052,723 A | 4/2000 | Ginn |
| 6,052,730 A | 4/2000 | Felciano et al. |
| 6,055,564 A | 4/2000 | Phaal |
| 6,065,056 A | 5/2000 | Bradshaw et al. |
| 6,065,059 A | 5/2000 | Shieh et al. |
| 6,073,135 A | 6/2000 | Broder et al. |
| 6,073,239 A | 6/2000 | Dotan |
| 6,078,913 A | 6/2000 | Aoki et al. |
| 6,178,419 B1 | 1/2001 | Legh-Smith et al. |
| 6,178,505 B1 | 1/2001 | Schneider et al. |
| 6,182,118 B1 | 1/2001 | Finney et al. |
| 6,219,667 B1 | 4/2001 | Lu et al. |
| 6,233,618 B1 * | 5/2001 | Shannon ............... 709/229 |
| 6,246,977 B1 | 6/2001 | Messerly et al. |
| 6,253,188 B1 | 6/2001 | Witek et al. |
| 6,266,664 B1 | 7/2001 | Russell-Falla et al. |
| 6,295,529 B1 | 9/2001 | Corston-Oliver et al. |
| 6,295,559 B1 | 9/2001 | Emens et al. |
| 6,338,088 B1 | 1/2002 | Waters et al. |
| 6,356,864 B1 | 3/2002 | Foltz et al. |
| 6,377,577 B1 | 4/2002 | Bechtolsheim et al. |
| 6,389,472 B1 * | 5/2002 | Hughes et al. ............ 709/229 |
| 6,418,433 B1 | 7/2002 | Chakrabarti et al. |
| 6,456,306 B1 | 9/2002 | Chin et al. |
| 6,466,940 B1 | 10/2002 | Mills |
| 6,486,892 B1 | 11/2002 | Stern |
| 6,493,744 B1 | 12/2002 | Emens et al. |
| 6,505,201 B1 | 1/2003 | Haitsuka et al. |
| 6,519,571 B1 | 2/2003 | Guheen et al. |
| 6,539,430 B1 * | 3/2003 | Humes ............... 709/225 |
| 6,567,800 B1 | 5/2003 | Barrera et al. |
| 6,571,249 B1 | 5/2003 | Garrecht et al. |
| 6,606,659 B1 * | 8/2003 | Hegli et al. ............ 709/225 |
| 6,675,169 B1 | 1/2004 | Bennett et al. |
| 6,741,997 B1 | 5/2004 | Liu et al. |
| 6,742,003 B2 | 5/2004 | Heckerman et al. |
| 6,772,214 B1 * | 8/2004 | McClain et al. ............ 709/229 |
| 6,785,732 B1 | 8/2004 | Bates et al. |
| 6,832,230 B1 | 12/2004 | Zilliacus et al. |
| 6,907,425 B1 | 6/2005 | Barrera et al. |
| 6,947,935 B1 | 9/2005 | Horvitz et al. |
| 6,947,985 B2 | 9/2005 | Hegli et al. |
| 6,978,292 B1 | 12/2005 | Murakami et al. |
| 6,981,281 B1 | 12/2005 | LaMacchia et al. |
| 7,065,483 B2 | 6/2006 | Decary et al. |
| 7,093,293 B1 | 8/2006 | Smithson et al. |
| 7,133,409 B1 * | 11/2006 | Willardson ............... 370/401 |
| 7,209,893 B2 | 4/2007 | Nii |
| 7,213,069 B2 | 5/2007 | Anderson et al. |
| 7,313,823 B2 * | 12/2007 | Gao ............... 726/26 |
| 7,603,685 B2 | 10/2009 | Knudson et al. |
| 7,603,687 B2 | 10/2009 | Pietraszak et al. |
| 2001/0032205 A1 | 10/2001 | Kubaitis |
| 2001/0032258 A1 | 10/2001 | Ishida et al. |
| 2002/0042821 A1 | 4/2002 | Muret et al. |
| 2002/0059221 A1 * | 5/2002 | Whitehead et al. ............... 707/5 |
| 2002/0073089 A1 | 6/2002 | Schwartz et al. |
| 2002/0099952 A1 | 7/2002 | Lambert et al. |
| 2002/0110084 A1 | 8/2002 | Butt et al. |
| 2002/0129039 A1 | 9/2002 | Majewski et al. |
| 2002/0129140 A1 | 9/2002 | Peled et al. |
| 2002/0133509 A1 | 9/2002 | Johnston et al. |
| 2002/0152284 A1 | 10/2002 | Cambray et al. |
| 2002/0174358 A1 | 11/2002 | Wolff et al. |
| 2002/0194194 A1 * | 12/2002 | Fenton et al. ............... 707/104.1 |
| 2003/0023860 A1 | 1/2003 | Eatough et al. |
| 2003/0028564 A1 | 2/2003 | Sanfilippo |
| 2003/0074567 A1 | 4/2003 | Charbonneau |
| 2003/0105863 A1 * | 6/2003 | Hegli et al. ............ 709/225 |
| 2003/0126136 A1 | 7/2003 | Omoigui |
| 2003/0126139 A1 | 7/2003 | Lee et al. |
| 2003/0149692 A1 | 8/2003 | Mitchell |
| 2003/0177187 A1 | 9/2003 | Levine et al. |
| 2003/0182420 A1 | 9/2003 | Jones et al. |
| 2004/0015586 A1 | 1/2004 | Hegli et al. |
| 2004/0019656 A1 | 1/2004 | Smith et al. |
| 2004/0068479 A1 | 4/2004 | Wolfson et al. |
| 2004/0078591 A1 | 4/2004 | Teixeira et al. |
| 2004/0111499 A1 | 6/2004 | Dobrowski et al. |
| 2004/0167931 A1 | 8/2004 | Han |
| 2004/0220924 A1 | 11/2004 | Wootton |
| 2005/0155012 A1 | 7/2005 | Tayama et al. |
| 2006/0036874 A1 | 2/2006 | Cockerille et al. |

FOREIGN PATENT DOCUMENTS

| | | |
|---|---|---|
| EP | 0 748 095 | 12/1996 |
| EP | 1 329 117 | 7/2003 |
| EP | 1 638 016 | 3/2006 |
| JP | 10 243018 | 9/1998 |
| JP | 2000-235540 | 8/2000 |
| WO | WO 92/19054 | 10/1992 |
| WO | WO 96/42041 | 12/1996 |
| WO | WO 98/28690 | 7/1998 |
| WO | WO 01/33371 | 5/2001 |
| WO | WO 01/55873 | 8/2001 |
| WO | WO 01/55905 | 8/2001 |
| WO | WO 01/63835 A1 | 8/2001 |
| WO | WO 2005/017708 | 2/2005 |
| WO | WO 2005/119488 | 12/2005 |
| WO | WO 2006/027590 | 3/2006 |
| WO | WO 2006/062546 | 6/2006 |

OTHER PUBLICATIONS

Greenfield, P., et al., Access Prevention Techniques for Internet Content Filtering, CSIRO (XP002265027), Dec. 1999.

International Search Report and Written Opinion dated Jun. 30, 2008 for PCT Patent Application No. PCT/US2007/024557.

International Search Report, International Application No. PCT/US2006/049149, Mailed Mar. 10, 2008, 4 pages.

Microsoft Press Computer Dictionary, 3rd edition, Pub: Microsoft Press, 1997, pp. 262, 276.

PCT International Search Report and Written Opinion for International Application No. PCT/US2008/052483, PCT, Feb. 11, 2009.

"Bloom Filter" on Wikipedia, http://en.wikipedia.org/wiki/Bloom_filter, retrieved on Jul. 31, 2009.

Abiteboul, et al., The Lorel query language for semistructured data, Int'l Journal on Digital Libraries, Apr. 1, 1997, vol. 1, Issue 1, pp. 68-88.

Chawathe, et al., Representing and querying changes in a semistructured data, Proceedings from 14th Int'l Conference, Feb. 23-27, 1998, pp. 4-13.

Dell Zhang, et al., A data model and algebra for the web, Proceedings 10th Int'l Workshop on Florence, Italy, Sep. 1-3, 1999, pp. 711-714.

Goldman, R., et al., DataGuides: Enabling Query Formulation and Optimization in Semistructured Databases, Proceedings of the International Conference on Very Large Data Bases, Aug. 26, 1997, pp. 436-445.

Nestorov, et al., Representative objects: concise representations of semistructured, hierarchical Data, Proceedings, 13th Int'l Conference in Birmingham, UK, Apr. 7-11, 1997, pp. 79-90.

* cited by examiner

SYSTEM AND METHOD FOR ADAPTING AN INTERNET FILTER

RELATED CASES

This application is a continuation of copending application Ser. No. 10/017,750, filed Dec. 7, 2001, and titled SYSTEM AND METHOD FOR ADAPTING AN INTERNET FILTER, which is hereby incorporated by reference in its entirety.

BACKGROUND OF THE INVENTION

Description of the Related Art

The Internet is a global system of computers that are linked together so that the various computers can communicate seamlessly with one another. Internet users access server computers to download and display informational pages. Once a server has been connected to the Internet, its informational pages can be displayed by virtually anyone having access to the Internet.

The easy access and inexpensive cost of retrieving Internet pages has led to several problems for controlling access to inappropriate information, such as pornography. Several solutions to this problem have been proposed, including rating systems similar to that used for rating movies so that a parent or employer could control access to Internet servers, or pages, that have a particular rating. Unfortunately, this mechanism requires each person running an Internet server to voluntarily rate their site. Because of the free-wheeling nature of the Internet, this type of voluntary rating scheme is unlikely to be very efficient for preventing access to sites, such as those containing pornography, that most parents or businesses desire to block.

In addition to a rating scheme, others have developed databases that contain the uniform resource locator (URL) address of sites to be blocked. These databases are integrated into network computer systems and Internet firewalls so that a person wishing access to the Internet first has their URL request matched against the database of blocked sites. The user cannot access any URL found in the database. One such system is described in U.S. Pat. No. 5,678,041 to Baker et al. Unfortunately, such systems rely on the completeness of the database of accessed sites to be complete. Because new servers and URLs are being added to the Internet on a daily basis, as well as current servers being updated with new information, these databases do not provide a complete list of sites that should be blocked.

SUMMARY OF THE INVENTION

The systems and methods have several features, no single one of which is solely responsible for its desirable attributes. Without limiting the scope as expressed by the claims which follow, its more prominent features will now be discussed briefly. After considering this discussion, and particularly after reading the section entitled "Detailed Description" one will understand how the features of the system and methods provide several advantages over traditional filter systems.

One aspect is a system for collecting identifiers for updating a filtering system which controls access to Internet websites/pages between a local area network and an Internet, the system comprises a workstation configured for a user to send an identifier to request an Internet website/page, an Internet gateway system coupled to the workstation and configured to receive the identifier and to allow or deny access to the Internet website/page associated with the identifier, and a master database of identifiers along with one or more categories associated with each identifier. The system further comprises a filter system coupled to the Internet gateway system and configured to receive the identifier from the Internet gateway system, determine whether the identifier is in the master database, send the identifier to a database factory if the identifier is not in the master database, and apply one or more rules to one or more categories that are associated with the identifier, wherein the one or more categories are from the master database or are received from the database factory, and a database factory configured to receive the identifier from the filter system if the identifier was not in the master database, determine whether the identifier was previously categorized by the database factory, if the identifier was not previously categorized, determine the one or more categories to associate with the identifier and provide the one or more categories to the filter system, else provide the one or more categories that are associated with the previously categorized identifier.

Another aspect is a method for adapting a filter system which controls access to Internet sites, the method comprises receiving a request from a user in the form of an identifier to access a website/page, determining whether the identifier is in a master database of categorized identifiers and one or more categories associated with the identifier, if the identifier is not in the master database, determining whether the identifier is in an uncategorized database, else applying one or more rules to the one or more categories associated with the identifier. The method further comprises if the identifier is not in the uncategorized database, posting the identifier to the uncategorized database, else updating a request frequency in the uncategorized database that is associated with the identifier, uploading the uncategorized database to a database factory, and determining whether each identifier has been previously categorized by the database factory, for each identifier that was not previously categorized, categorizing each identifier, a website/page associated with the identifier, and/or the additional data to select one or more categories to associated with each identifier. The method still further includes posting each identifier along with its selected one or more categories into a database of categorized sites, and downloading the database of categorized sites to the filter system for incorporation into the master database.

DETAILED DESCRIPTION

The following detailed description is directed to certain specific embodiments of the invention. However, the invention can be embodied in a multitude of different systems and methods. In this description, reference is made to the drawings wherein like parts are designated with like numerals throughout.

In connection with the following description many of the components of the various systems, some of which are referred to as "module," can be implemented as software, firmware or a hardware component, such as a Field Programmable Gate Array (FPGA) or Application-Specific Integrated Circuit (ASIC), which performs certain tasks. Such components or modules may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented to execute on one or more computers.

Figure 1:
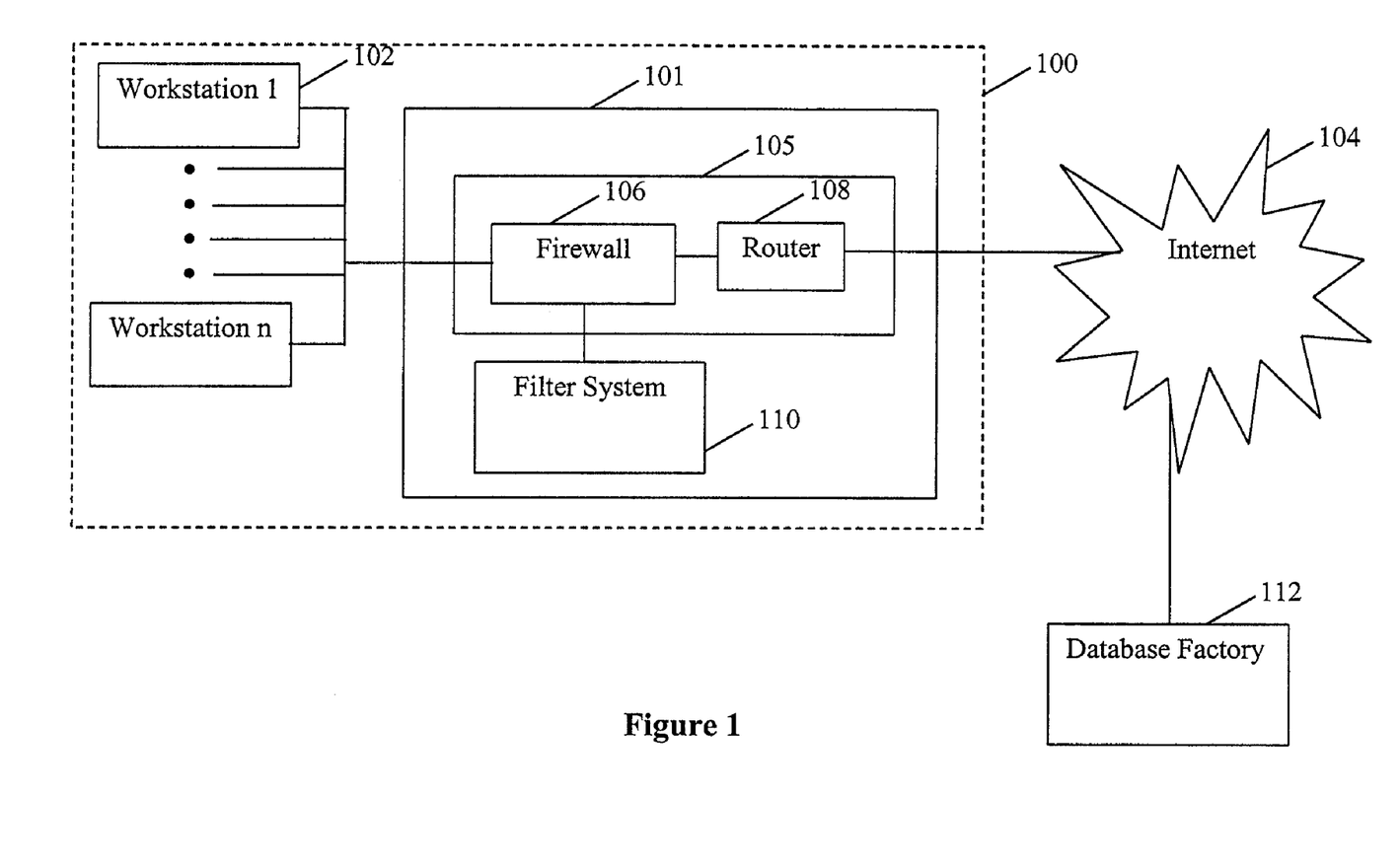
FIG. 1 is a block diagram of a site collection system for controlling access to Internet sites.

FIG. 1 is a block diagram of a local area network (LAN) 100 coupled to an Internet 104 and a database factory 112 also coupled to the Internet 104. For ease of explanation only a single LAN is shown though two or numerous such networks would more typically be included. Similarly, two or more database factories could also be deployed.

The LAN 100 includes one or more workstations 102 coupled to an access system 101. The access system 101 includes an Internet gateway system 105 and a filter system 110. LANs may also include other devices such as servers (not shown). The LAN communicates via the Internet gateway system 105 in order to provide the workstation(s) 102 with communication to sites on the Internet 104. The LAN 100 can have an Ethernet 10baseT topology, or be based on any networking protocol, including wireless networks, token ring network, and the like.

The workstation 102 is coupled to the Internet gateway system 105. The workstation 102 can be a personal computer operating, for example, under the Microsoft Windows Operating System. However, other computers, such as those manufactured by Apple, IBM, Compaq, Dell, Sun Microsystems or other system, can be used.

The Internet gateway system 105 couples the LAN 100 and the Internet 104. Internet gateway systems are well known in the art and normally communicate through connection devices, such as routers or other data packet switching technology, for translating Internet TCP/IP protocols into the proper protocols for communicating with the Internet 104. The Internet gateway system 105 used to implement a given system can vary as well as its location within the LAN 100. For example, Internet gateway system 105 could be located at the workstation(s) 102 or connected peripherally to the Internet 104. The Internet gateway system 105 illustrated in FIG. 1 includes a firewall module 106 coupled to a router module 108.

The firewall module 106 provides an electronic boundary between devices on the LAN 100, such as the workstation(s) 102, and the Internet 104 to prevent unauthorized users from accessing computer resources on the LAN 100. More specifically, the firewall module 106 monitors data packets flowing to and from the Internet 104. Thus, all communications between the Internet 104 and the LAN first pass through the firewall module 106. The firewall module 106 can be one of the many firewall software programs commercially available, such as Firewall-1 (Check Point software, Redwood City, Calif.). However, it should be realized that while the system described in FIG. 1 has the firewall module 106 controlling access of data packets between the Internet 104 and the workstations 102, other similar access control systems are available and can be used. For example, the Microsoft proxy server (Microsoft Corp., Redmond, Wash.), Netscape proxy server (Netscape Corp) and the Cisco PIX Firewall (Cisco Corp.) are currently available and can also be used as the firewall module 106. Alternatively, a caching device can be utilized to provide access control. For example, the Inktomi Traffic Server (Inktomi Corp.) and the Network Appliance NetCache (Network Appliance Inc.) can be used.

The router module 108 is configured to find a best path for a data packet that is sent from the firewall 106 to the Internet 104. The router module 108 stores and forwards electronic messages between the firewall and the requested website/page, first determining all possible paths to the destination address and then picking the most expedient route, based on the traffic load and the number of hops.

Still referring to FIG. 1, a filter system 110 is shown coupled to the firewall module 106. The filter system 110 receives user requests for accessing Internet websites/pages from the firewall module 106. Alternatively or additionally, the filter system can receive or monitor user requests for accessing the Internet from other points on the LAN. The filter system 110 determines whether the user will be allowed access to the requested website/page. Examples of techniques that can be used with the methods and systems disclosed herein are disclosed in U.S. patent application Ser. No. 09/494,315, filed Jan. 28, 2000, and entitled SYSTEM AND METHOD FOR CONTROLLING ACCESS TO INTERNET SITES, which is hereby incorporated by reference in its entirety.

The internet 104 in FIG. 1 is a network or combination of networks spanning any geographical area, such as a local area network, wide area network, regional network, national network, and/or global network. Such networks may be hardwire, wireless, or a combination of hardwire and wireless.

The database factory 112 is shown connected to the filter system 110 via the Internet 104. Alternatively, the filter system 110 can communicate with the database factory 112 in other known ways such as a direct telephone link, a private network connection, or other suitable communication link.

Figure 2:
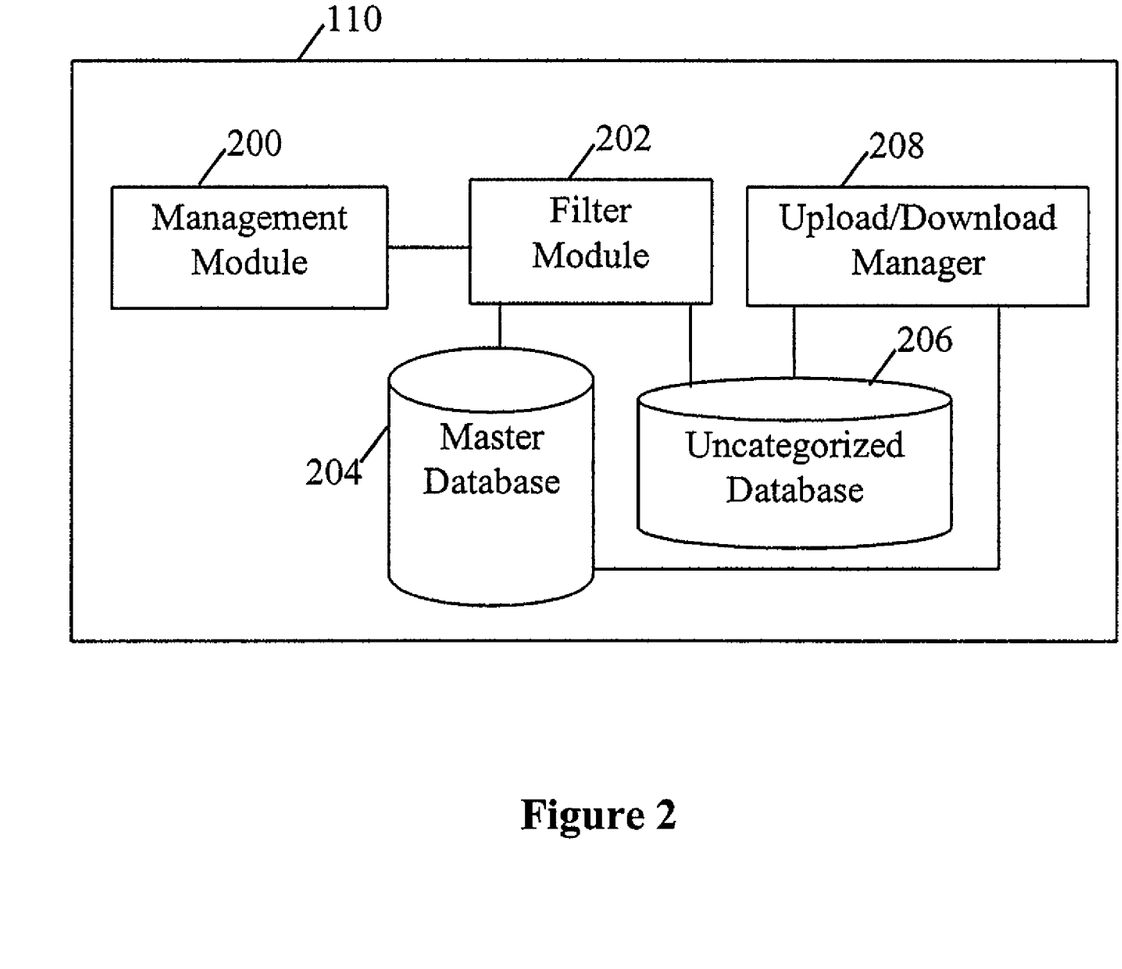
FIG. 2 is a block diagram of a filter system.

FIG. 2 is a block diagram of the filter system 110 from FIG. 1 which communicates with the Internet gateway system 105. The filter system 110 can include a management module 200, a filter module 202, an upload/download manager module 208, a master database 204, and an uncategorized database 206.

A system administrator or the like interfaces with the filter system 110 via the management module 200 to select or create rules for users and/or groups of users. These rules can include, for example, allowing access to websites in selected categories and blocking access to websites in other categories. Rules can also include flexible filters. For example, rather than simply blocking or allowing access to the website/page, the system administrator selects or creates a flexible filter which is applied to the request. Example of flexible filters include, postponing the user's access, allowing the user to override denial of access, limiting the user's access based on a quota, and limiting the user's access based on a network load. Each requested website/page or category of website/pages can be associated with one or more rules.

The filter module 202 filters each request for Internet websites/pages using the master database 204 in conjunction with the rules. The filter module 202 analyzes the Internet website/page request from the workstation and then compares the Internet website/page request with the master database 204 of categorized Internet website/pages. It should be noted that the address could be a single page within an Internet website, or the default address of the website (e.g.: www.company.com). The master database 204 includes a list of websites/pages which can be in the form of URLs along with one or more categories associated with each URL. A URL (Uniform Resource Locator) is the address of a computer or a document on the Internet that consists of a communications protocol followed by a colon and two slashes (e.g.: http://), the identifier of a computer, and usually a path through a directory to a file. The identifier of the computer can be in the form of a domain name, for example www.m-w.com, or an Internet Protocol (I.P.) address, for example 123.456.789.1. A unique domain name can correspond to multiple I.P. addresses. Though often addresses, components thereof (for example, I.P. address, domain name, and communication protocol), or other location identifiers can be used to identify computers or documents on the Internet, for ease of description the term URL is used hereafter. The master database 204 can also include additional data associated with the URL. For example, a request frequency for the categorized website/page can be included in the master database 204. If the URL of the categorized website/page is found in the master database 204, the request frequency in the master database 204 can be updated for the requested website/page. A reporter log (not shown) can be used to track requested websites/pages that are found in the master database 204.

The filter module 202 checks to see if the requested website/page address matches any addresses stored in the master database 204. If an address match between the requested address and the master database 204 is found, the filter system 110 applies the rule(s) associated with the one or more categories that match the requested address and the user. For example, if application of the rule by the filter module 202 indicates that the requested website/page is to be blocked, a pre-defined block page is sent to the user's browser explaining that the request is not allowed and why. Alternatively, the filter system 110 simply closes the connection that was requested by the Internet browser to the requested website/page.

If the filter module 202 does not find the URL in the master database 204 (i.e. the URL is uncategorized), the filter module 202 then determines how to proceed with the uncategorized Internet website/page. For example, user access to the requested website/page can be allowed when the filter module 202 determines that the website/page is uncategorized. Alternatively, the filter module 202 can block access to uncategorized sites.

Even when the requested website/page is not found in the master database 204, the filter module 202 can pre-filter, or scan, the requested website/page for specific characteristics. These specific characteristics can relate to one or more of the categories found in the master database 204. For example, the scan can identify whether the uncategorized website/page includes characteristics that are indicative of pornography. This scan can be accomplished by, for example, searching the requested website/page and URL for text strings, graphics, audio and the like which have a high correlation with pornography websites. The filter module 202 can then associate an indicator with the uncategorized website/page based on the results of the scan. The indicator can be, for example, a specific category flag that relates to characteristics found during the scan of the uncategorized website/page. Continuing with the example above, if a text string was found that was indicative of pornography, a pornography flag would be attached to the uncategorized website/page. Alternatively, the filter module 202 performs the categorization of the URL and adds the URL and associated categories to the master database 204.

For uncategorized websites/pages, the filter module 202 determines whether they are represented in the uncategorized database 206 of URLs. If they are not, the filter module 202 stores the URLs associated with the requested uncategorized websites/pages in the uncategorized database 206. The uncategorized database can include additional data associated with the URL. For example, the request frequency for the uncategorized website/page and/or one or more indicators identified during the filter module's scan of the uncategorized website/page can be included in the uncategorized database 206. If the URL of the uncategorized website/page is found in the uncategorized database 206, the request frequency can be updated for the requested website/page.

Still referring to FIG. 2, the upload/download manager module 208 can transmit data from the uncategorized database 206 and the master database 204 to the database factory 112 (see FIG. 1). The upload could be immediate or periodic depending on the level of service required. For example, a daily upload after normal business hours could be used. The upload/download module 208 can refer to the request frequency and/or one or more indicators to prioritize the URLs in the uncategorized database 206 for their transmission to the database factory 112. If data from the master database 204 is to be uploaded to the database factory 112, the upload/download module 208 can refer to a request frequency for websites/pages found in the master database 204. The request frequency can be used to prioritize the URLs in the master database 204 for their transmission to the database factory 112.

Figure 3:
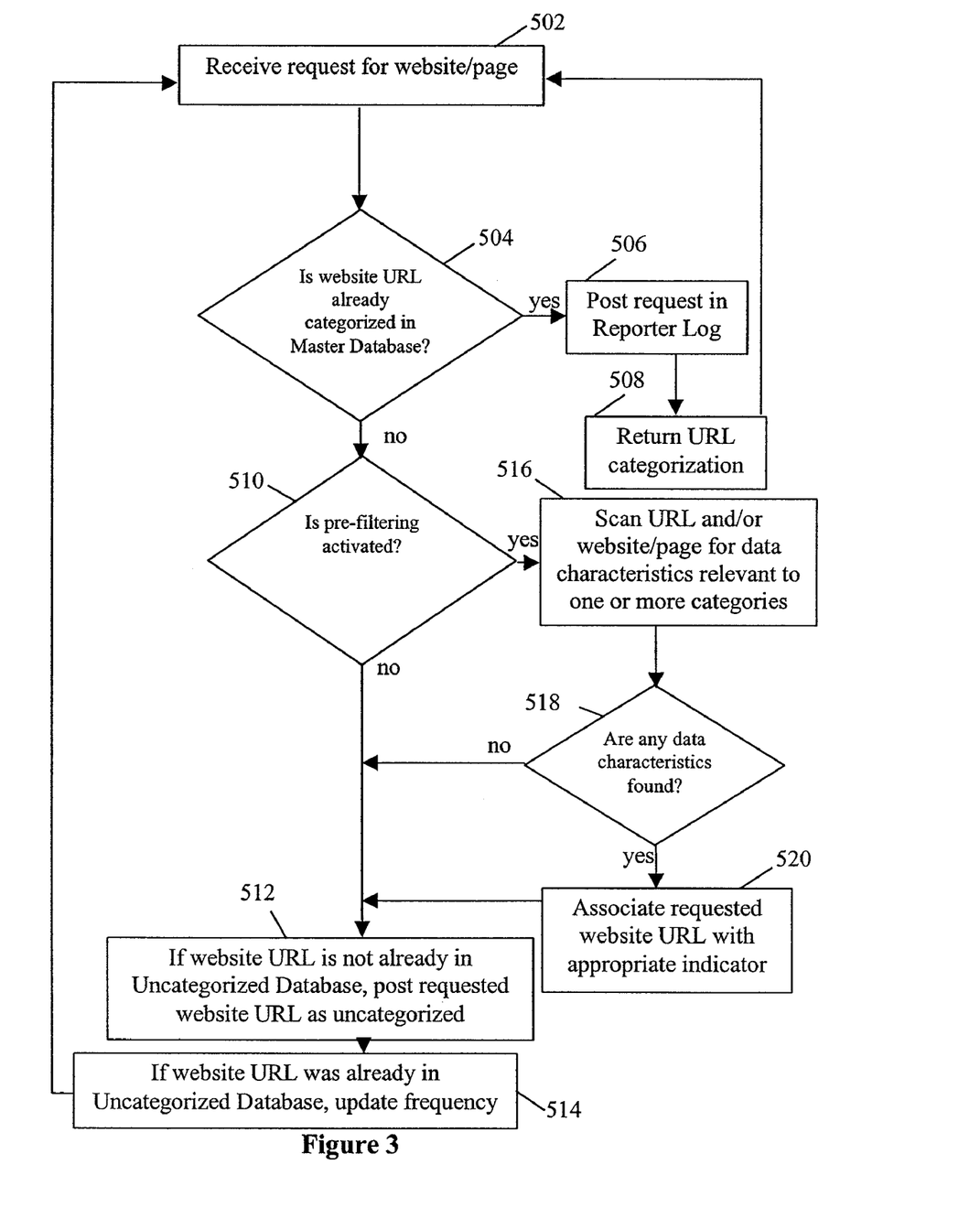
FIG. 3 is a flow diagram illustrating a process for collecting collection data.

FIG. 3 is a flow diagram illustrating a process performed by the filter system 10 to collect uncategorized websites/pages. The collection process begins at a state 502 where the filter module 202 receives a user request in the form of a URL to access a website/page. As was noted above, the requested URL and the identification of the user can be received from the Internet gateway system 105 or from a direct monitoring of traffic on the LAN by the filter system 110. Next, the process moves to a decision block 504 where the filter module 202 determines whether the URL is in the master database 204. If the URL is in the master database 204, the process proceeds to a state 506 where the request for the website is posted in a reporter log. The reporter log is available to the system administrator for tracking requests for websites/pages. Alternatively, the request for a website that is found in the master database 204 is posted to the request frequency in the master database 204. The process moves to a state 508 where the filter module 202 recalls the one or more categories that are associated with the requested website/page. The filter module 202 can then apply one or more rules associated with the requesting user and the one or more categories.

Returning to the decision block 504, if the URL is not in the master database 204, the process continues to a decision state 510 where the filter module 202 determining whether to pre-filter the uncategorized URL. The system administrator can select whether pre-filtering is to be performed by the filter module 202. If the filter module 202 does not perform pre-filtering, the process proceeds to a state 512 where the filter module 202 posts the URL to the uncategorized database 206 as uncategorized. Next, at a state 514, if the URL was already posted in the uncategorized database 206, the filter module 202 updates the request frequency associated with the URL. The process then returns to state 502 where the filter module waits to receive the next request for a website/page. Additionally, the filter module can allow or deny access to the user based upon a rule for uncategorized URLs.

Returning to decision state 510, if the filter module 202 is to perform pre-filtering, the process moves to a state 516 where the filter module 202 scans or analyzes the URL and/or website/page associated with the requested URL for specific characteristics that are indicative of one or more categories. The process continues to a decision state 518 where the filter module 202 determines whether any data characteristics were found during the scan. If data characteristics were found, the process moves to a state 520 where an indicator, for example, a flag, is associated with the requested URL. The process then continues to state 512 as described above where the URL is stored in the uncategorized database with the indicator.

Figure 4:
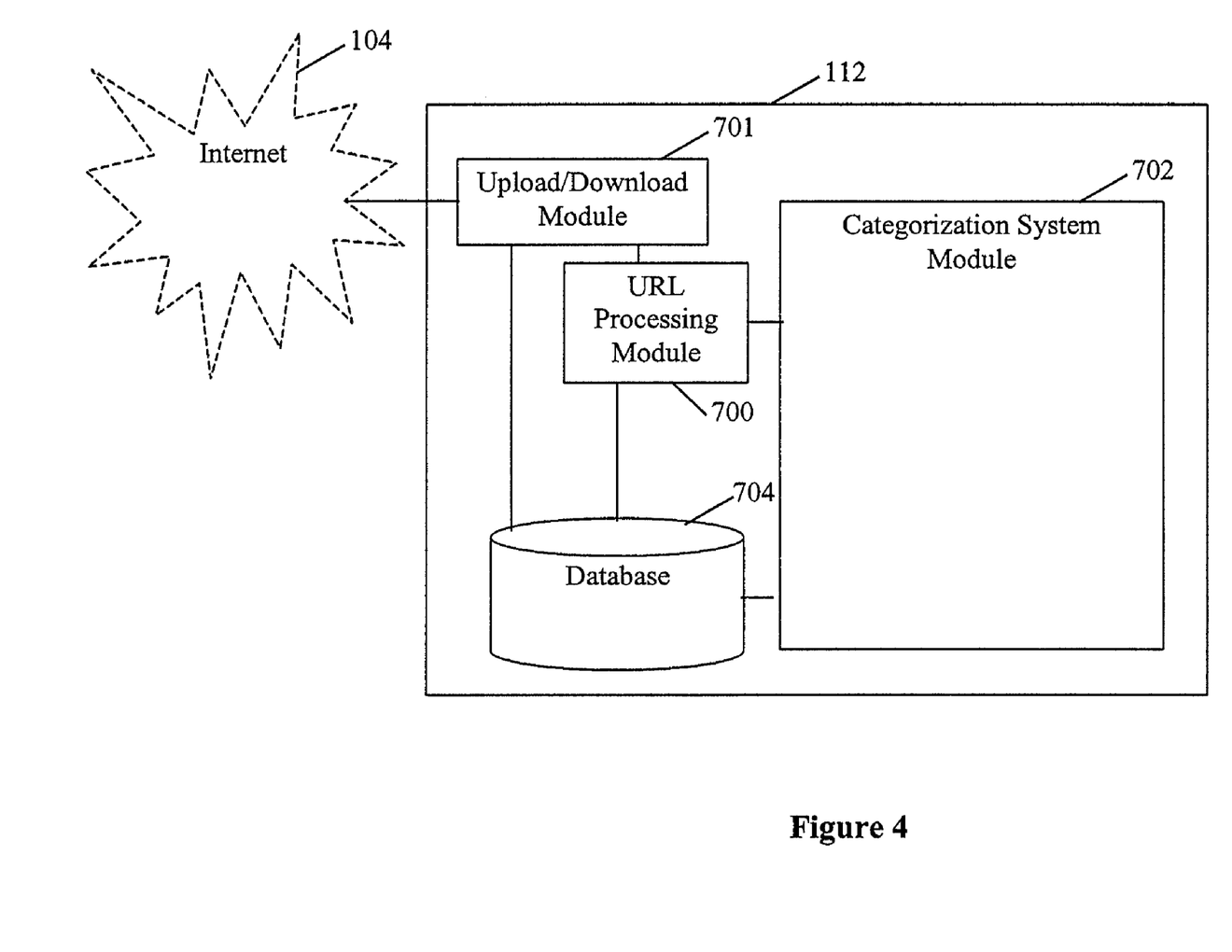
FIG. 4 is block diagram of a database factory.

FIG. 4 is block diagram of the database factory 112 connected to the Internet 104. The database factory 112 provides the master databases to filter system(s) and processes websites/pages that are associated with uncategorized URLs and other information, for example, frequency usage in the master database. For example, the database factory 112 receives uncategorized URLs and any additional data associated with the URL from the filter system 110 and downloads categorized URLs to the filter system. The database factory 112 can also upload the request frequency for website/pages found in the master database 204. Additional techniques available to the database factory 112 for collecting URLs include, for example, using a domain name system (DNS), using an Internet search engine, mining high trafficked website/page directories, and receiving suggested sites from the public.

The database factory 112 can include an upload/download module 701, a URL processing module 700, a categorization system module 702, and a database 704 of categorized URLs.

One function of the upload/download module 701 is to receive URLs and any additional data associated with the URLs from the filter system 110. In one embodiment, the URLs include URLs from the uncategorized database 206 and URLs from the master database 204. The additional data can include a request frequency for a website\page found in the master database 204, a request frequency for a website/page found in the uncategorized database 206, an indicator associated with a URL, a trace ID, and a primary language used by a filter system. For ease of explanation, the term collection data will be used to include URLs and any additional data associated with the URL. Additionally, the upload/download module 701 downloads the master database to the filter system(s), as will be described more fully below.

The URL processing module 700 receives the collection data from the upload/download module 701. The URL processing module 700 processes the collection data. Processing can include merging, sorting, and determining a language for the collection data from multiple filter systems. The URL processing module 700 determines whether each URL in the collection data requires categorization. If the URL has not been previously categorized, the categorization system module 702 receives the URL and any additional data associated with the URL from the URL processing module 700.

The categorization system module 702 categorizes URLs which are then added to the database 704 of categorized sites. The categorization system module 702 can analyze each URL, the website/page associated with the URL, and any additional data associated with the URL to determine its appropriate category or categories.

The categorization system module 702 can include an automated categorization or classification engine to determine the appropriate category or categories of the URL. The automated categorization engine can determine statistical probabilities and multidimensional vectors during the categorization process. Categorization can be based upon word analysis, adaptive learning systems, and image analysis. The categorization system module 702 can interface with a human checker to determine the appropriate category or categories of the URL. The categorization system module 702 can include the automated categorization engine and the human checker to determine the appropriate category or categories of the URL. For example, the automated categorization engine can initially determine the appropriate category. The human checker can verify that the URL is correctly categorized. The categorization system 702 determines whether the human checker is required to review the categorization results for each URL. If a human checker is involved, his results can also be utilized to refine the automated categorization engine. Once categorized, the categorization system module 702 posts the URL along with its associated one or more categories into the database 704 of categorized sites.

The categorization system module 702 can include a language analyzer. The language analyzer determines the language of the website for each URL. Determining the language can facilitate the categorization process by allowing each human checker to be language dependent.

The database 704 of categorized sites can include URLs and their associated categories. The database 704 can be stored in a relational database management system, such as Oracle, Sybase, Informix, Microsoft Server, and Access.

Once the categorization system module 702 has posted the URL and its associated category or categories into the database 704, the upload/download module 701 thereafter routinely copies the database 704 to the filter system(s) 110. As can be imagined, the system can include thousands of filter systems, each of which is updated regularly by the upload/download module 701 to provide an updated database of categorized URLs. Moreover, the upload/download module 701 can transfer portions of the database 704, such as updates, to the filter system 110 so that the entire database does not need to be transmitted.

Figure 5:
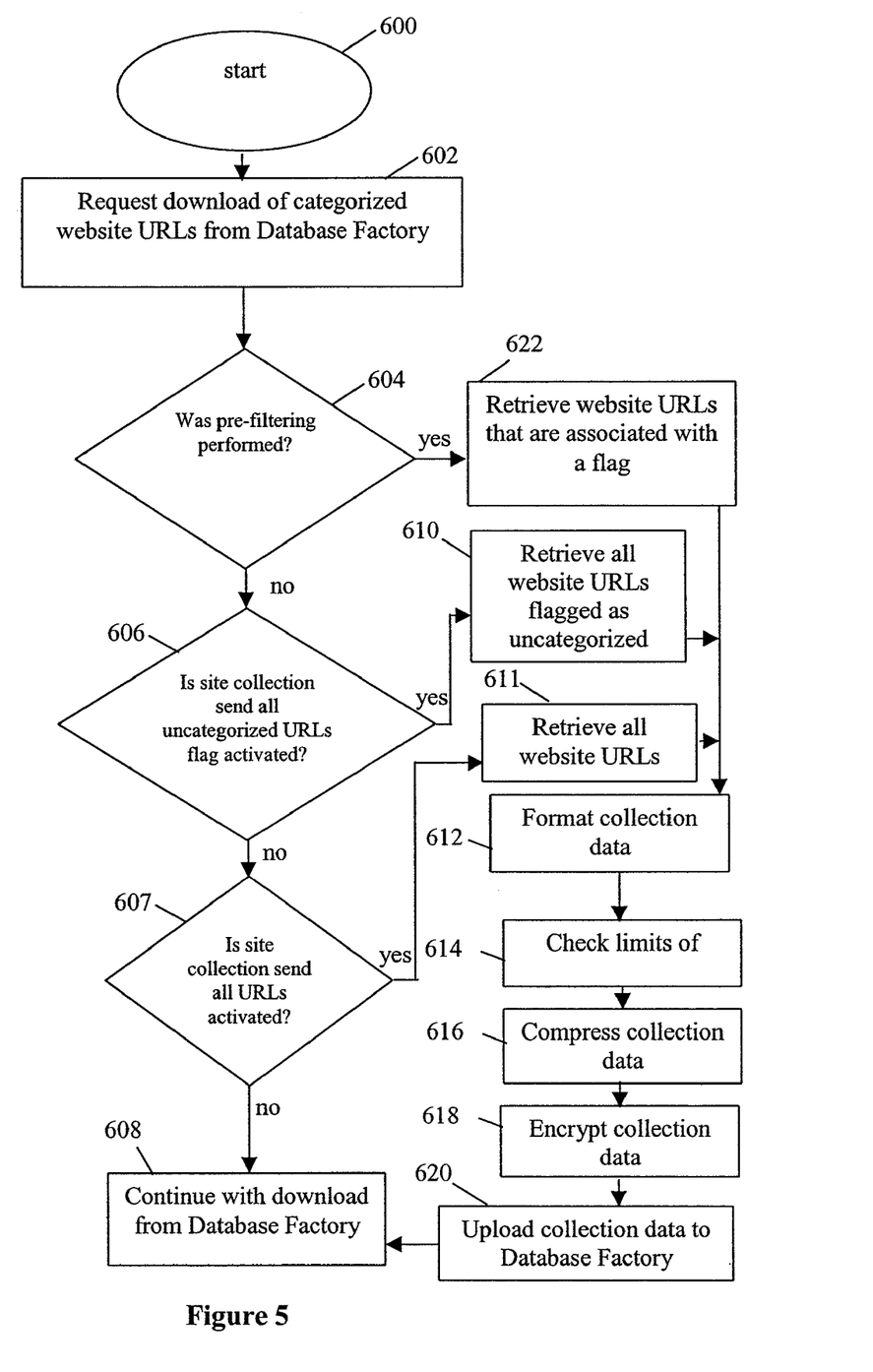
FIG. 5 is a flow diagram illustrating processing and uploading of collection data from the filter system to the database factory.

FIG. 5 is a flow diagram illustrating processing and uploading of collection data from the filter system 110 to the database factory 112. The process begins at a start state 600. Next, at a state 602, the upload/download manager module 208 (see FIG. 2) requests a download of URLs and their associated categories from the database factory 112. This request can be periodic, random, or at a set time. For example, the request can be made when the number of URLs or the number of stored bits in the uncategorized database reaches a selected level. The request can be made when a selected maximum request frequency for any of the URLs in the uncategorized database 206 is reached. The request can be made as a result of an uncategorized URL being associated with an indicator. For example, when a URL is associated with a pornography flag, the upload/download manager module 208 instigates an upload to the database factory 112. Additionally, the request can be in response to polling by the database factory 112. Alternatively, the upload/download module 701 can initiate the download. For example, the upload/download module 701 can initiate the process based on the current processing capacity of the categorization system module 702. If the categorization system module 702 is currently being underutilized, the upload/download module 701 can seek a filter system(s) and initiate an upload of the filter system's uncategorized database 206.

The process continues to a decision state 604 where the upload/download manager module 208 determines whether pre-filtering of the uncategorized URLs was performed by the filter module 202. This pre-filtering, or scanning, is performed to determine whether the requested website/page includes specific characteristics. These specific characteristics can relate to one or more of the categories found in the master database 204. For example, the scan can identify whether the uncategorized website/page includes characteristics that are indicative of pornography. The filter module 202 can then associate an indicator with the uncategorized website/page based on the results of the scan. The indicator can be, for example, a specific category flag that relates to characteristics found during the scan of the uncategorized website/page. The upload/download module 208 can refer to the one or more indicators to prioritize the URLs in the uncategorized database 206 for uploading to the database factory 112.

If pre-filtering was not performed, the process moves to a decision state 606 where the upload/download manager module 208 determines whether all of the uncategorized URLs are to be uploaded to the database factory 112. This provides the option to not upload the uncategorized database 206 but still receive a download of categorized sites from the database factory 112. The system administrator can select whether all of the uncategorized URLs are to be uploaded. If all of the uncategorized URLs are not to be uploaded, the process proceeds to a decision state 607 where the upload/download manager module 208 determines whether all of the URLs are to be uploaded. If all of the URLs are not to be uploaded, the process moves to a state 608 where the upload/download manager module 208 receives categorized URLs from the database factory 112. The upload/download module 701 can copy the database 704 to the filter system(s) 110. Thus each filter system 110 can be updated regularly by the upload/download module 701 to provide an updated database of categorized URLs. Moreover, the upload/download module 701 can transfer portions of the database 704, such as updates, to the filter system 110 so that the entire database does not need to be transmitted. The upload/download manager module 208 posts the categorized URLs into the master database 204.

Returning to decision state 606, if all of the uncategorized URLs are to be categorized by the database factory 112, the process moves to a state 610 where the upload/download manager 208 retrieves all URLs from the uncategorized database 206. The process moves to a state 612 where the uncategorized URLs and any additional data associated with the URLs, i.e. collection data, can be formatted. The additional data can include request frequencies and/or indicators associated with the URLs. For ease of explanation, the term collection data is being used to include URLs and any additional data associated with the URL. The collection data is not required to be formatted and thus may be directly uploaded to the database factory 112. Moreover, the selection of a format for the collection data can depend on the type of data connection that the database factory 112 has with the filter system 110. For a data connection via the Internet 104, the upload/download module 208 can use a markup language, for example, Extensible Markup Language (XML), Standard Generalized Markup Language (SGML), and HyperText Markup Language (HTML), to format the collection data.

The collection data can be further processed prior to its upload to the database factory 112. For example, limit block 614, compression block 616, and encryption block 618 can be performed to process the collection data for upload to the database factory 112. While these blocks may facilitate the upload of the collection data, they are not required to be performed. The collection data can be uploaded without applying blocks 614, 616, 618. Thus, the collection data can be directly uploaded to the database factory 112 without applying blocks 612 through blocks 618.

If further processing is desired, the process moves to a state 614 where the upload/download manager 208 checks the limits of the collection data. The upload/download manager 208 can limit the collection data to a maximum size for uploading to the database factory 112. For example, the collection data from a single filter system could be limited to a maximum of 20 Mbytes. The process continues to a state 616 where the collection data is compressed so that the collection data takes up less space. Next, at a state 618 the collection data is encrypted so that it is unreadable except by authorized users, for example, the database factory 112.

Flow continues to a state 620 where the collection data is uploaded to the database factory 112. As explained above, the collection data can include any additional data associated with the URL, for example, request frequencies and/or indicators. The process then moves to state 608 as described above to receive categorized URLs from the database factory 112.

Returning to decision state 604, if pre-filtering was performed by the filter module 202, the process moves to a state 622 where the upload/download manager 208 retrieves URLs that were associated with an indicator. The indicator can be, for example, a specific category flag that relates to characteristics found during the scan of the uncategorized website/page. Multiple indicators can be associated with a single URL. The upload/download module 208 can refer to the one or more indicators, and/or the request frequency to prioritize the URLs in the uncategorized database 206 for uploading to the database factory 112. The process then continues to state 612 where formatting can be performed on the URL and on any associated data as described above.

Returning to decision state 607, if all URLs are to be uploaded to the database factory 112, the process moves to a state 611 where the upload/download manager 208 retrieves all URLs that have been requested by users of the filter system 110. For example, the URLs from the uncategorized database 206 along with the URLs from the master database 204 are retrieved along with additional data, for example, request frequency. Alternatively, the URLs from the uncategorized database 206 along with data from the reporter log (not shown) is retrieved. The process then continues to state 612 where formatting can be performed on the URLs retrieved in state 611 and on any associated data as described above.

Figure 6:
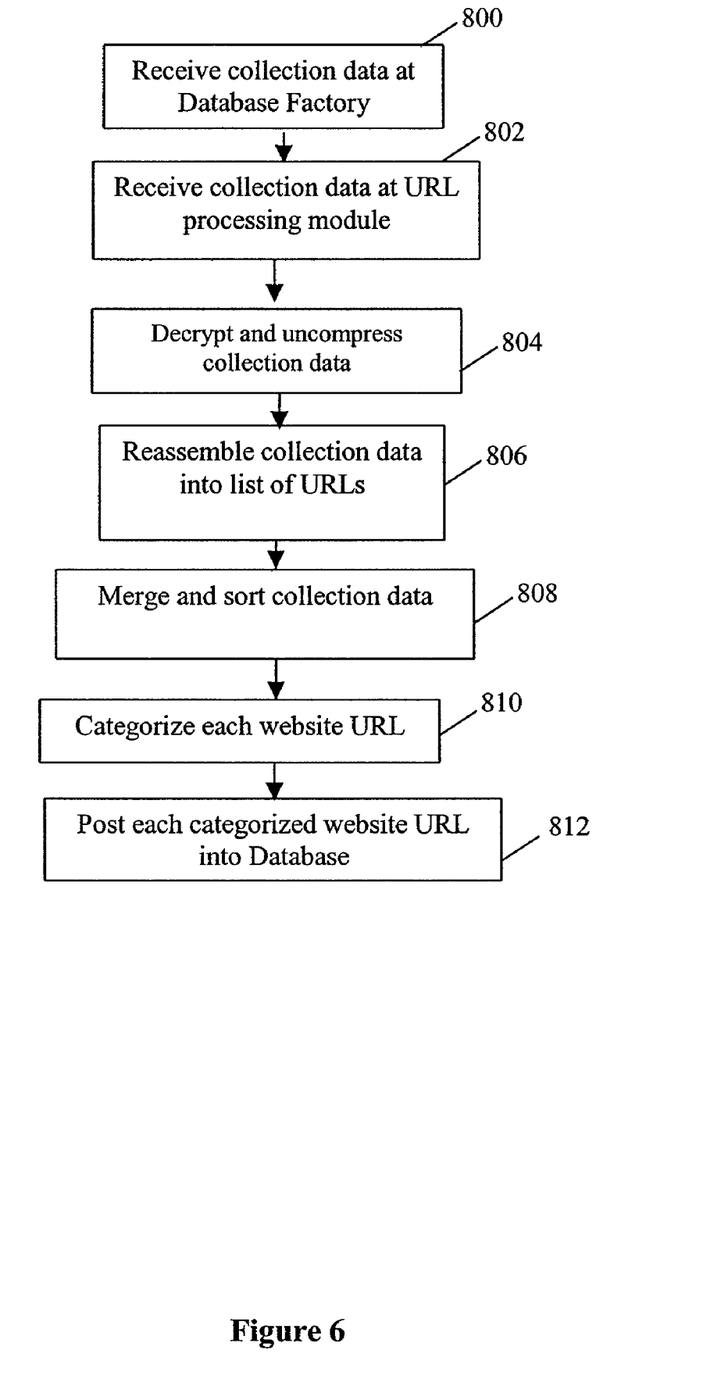
FIG. 6 is a flow diagram illustrating processing of collection data by the database factory.

FIG. 6 is a flow diagram illustrating the processing of collection data by the database factory 112. The process begins at a state 800 where the upload/download module 701 receives collection data from the filter system 110 (see FIG. 1). The time for receiving the collection data can be periodic, random, at a set time, or in response to polling. The upload/download module 701 and/or the upload/download manager module 208 can initiate the upload to the database factory 112. As explained above, the collection data can include any additional data associated with the URL, for example, request frequencies associated with URLs from the master database 204 and/or request frequencies associate with URLs from the uncategorized database 206, and/or indicators.

Next, at a state 802, the URL processing module 700 receives the collection data from the upload/download module 701. The collection data can be formatted or unformatted. Additionally, the collection data can be encrypted and/or compressed or not.

The process continues to a state 804 where the URL processing module 700 decrypts and uncompresses the collection data if decryption and/or uncompression is required. The process moves to a state 806 where the collection data is reassembled into a list of URLs and any additional data associated with the URL.

The process moves to a state 808 where the URL processing module 700 merges and sorts the collection data. The system can include thousands of filter systems, each of which is regularly uploading collection data from its filter system 110. As explained above, the collection data can include any additional data associated with the URL, for example, request frequencies and/or indicators. The URL processing module 700 can merge and sort the uploaded data for a filter system(s) based on the URL or any additional data associated with the URL. For example, the URL processing module 700 can refer to one or more indicators, and/or request frequencies to sort and merge the URLs from one or more filter systems.

The URL processing module 700 determines whether each URL in the collection data requires categorization. If the URL has not been previously categorized, the categorization system module 702 receives the URL and any additional data associated with the URL from the URL processing module 700.

Next, at a state 810 the categorization system module 702 categorizes URLs which are then added to the database 704 of categorized sites. As explained above, the categorization system module 702 can analyze each URL, the website/page associated with the URL, and any additional data associated with the URL to determine its appropriate category or categories. The categorization system module 702 can include an automated categorization/classification engine to determine the appropriate category or categories of the URL. Categorization can be based upon word analysis, adaptive learning systems, and image analysis. The categorization system module 702 can interface with a human checker to determine the appropriate category or categories of the URL. The categorization system module 702 can include the automated categorization engine and the human checker to determine the appropriate category or categories of the URL. The categorization system 702 determines whether the human checker is required to review the categorization results for each URL. If a human checker is involved, his results can also be utilized to refine the automated categorization engine.

The process continues to a state 812 where the categorization system module 702 posts the URL along with its associated one or more categories into the database 704 of categorized sites. The database 704 of categorized sites can include URLs and their associated categories.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method for processing and uploading identifiers for updating a filtering system which controls access to Internet sites, the method comprising:
   requesting a download of identifiers, each identifier being associated with a category;
   determining whether a database of identifiers is to be uploaded to a database factory, wherein the database of identifiers includes at least one uncategorized identifier corresponding to a website/page requested to be accessed by a user;
   if the database of identifiers is to be uploaded, retrieving identifiers from the database of identifiers;
   uploading the database of identifiers; and
   determining whether the uploaded database of identifiers has been previously categorized at the database factory.

2. The method of claim 1, wherein the database of identifiers includes a database of uncategorized identifiers, the at least one uncategorized identifier being a part of the database of uncategorized identifiers.

3. The method of claim 1, wherein the database of identifiers includes a master database of identifiers.

4. The method of claim 3, wherein the master database of identifiers includes a master database request frequency.

5. The method of claim 4, wherein the master database request frequency includes a frequency of requests for identifiers in the master database of identifiers.

6. The method of claim 1, wherein uploading the database of identifiers is periodic.

7. The method of claim 1, wherein uploading the database of identifiers is random.

8. The method of claim 1, wherein uploading the database of identifiers is at a set time.

9. The method of claim 1, wherein uploading the database of identifiers is in response to polling by a database factory.

10. The method of claim 2 further comprising:
    determining whether one or more indicators, which relate to the category, are associated with the at least one uncategorized identifier; and
    prioritizing the at least one uncategorized identifier based at least in part on the one or more indicators prior to uploading the database of uncategorized identifiers.

11. The method of claim 10 further comprising uploading additional data associated with the at least one uncategorized identifier.

12. The method of claim 11, wherein the additional data includes a request frequency.

13. The method of claim 11, wherein the additional data includes an indicator.

14. The method of claim 11, wherein the additional data includes a trace ID.

15. The method of claim 11, wherein the additional data includes a primary language used by the filter system.

16. The method of claim 11 further comprising processing the at least one uncategorized identifier and the additional data prior to uploading.

17. The method of claim 16, wherein the processing comprises:
    formatting the at least one uncategorized identifier and the additional data using a markup language; and
    limiting the size of an upload file which includes the at least one uncategorized identifier and the additional data.

18. The method of claim 17, further comprising:
    encrypting the at least one uncategorized identifier and the additional data; and
    compressing the at least one uncategorized identifier and the additional data.

19. The method of claim 18, wherein encrypting is performed using a data encryption standard (DES).

20. The method of claim 18, wherein the at least one uncategorized identifier is a uniform resource locator (URL).

21. The method of claim 18, wherein the at least one uncategorized identifier is an Internet Protocol (I.P.) address.

22. The method of claim 18, wherein the at least one uncategorized identifier is a domain name.

23. A method for processing identifiers for updating a filtering system which controls access to Internet sites, the method comprising:
    receiving identifiers from a filter system at a database factory, wherein at least one of the identifiers corresponds to an Internet site requested to be accessed by a user;

determining whether the at least one identifier has been previously categorized at the database factory;

if the at least one identifier was not previously categorized, categorizing the at least one identifier, a website/page associated with the at least one identifier, and/or additional data associated with the at least one identifier, and associating output with the at least one identifier; and posting the at least one identifier along with the associated output into a database of categorized sites.

24. The method of claim 23, wherein the output includes one or more categories.

25. The method of claim 23, wherein the output includes a statistical probability.

26. The method of claim 23, wherein the output includes a multidimensional vector.

27. The method of claim 23, wherein categorizing the at least one identifier is performed by an automated classification engine.

28. The method of claim 23, wherein the at least one identifier is uncategorized.

29. The method of claim 23, wherein the at least one identifier is categorized.

30. The method of claim 29 further comprising receiving a master database request frequency which indicates the frequency that the categorized identifier was requested at the filter system.

31. The method of claim 27 further comprising verifying that the output associated with the at least one identifier is correct.

32. The method of claim 31, wherein verifying is performed by human review.

33. The method of claim 32 further comprising providing feedback from the human review to the automated classification engine.

34. A system for collecting identifiers comprising:
a computer configured for a user to send an identifier to request a website/page;
a master database of identifiers, the identifiers being associated with one or more categories;
a first server configured to receive the identifier, determine whether the identifier is in the master database of identifiers, send the identifier to a second server if the identifier is not in the master database, and apply one or more rules to one or more categories that are associated with the identifier, wherein the one or more categories are received from the second server; and
a second server configured to receive the identifier from the first server if the identifier was not in the master database, determine whether the identifier was previously categorized by the second server, if the identifier was not previously categorized, determine the one or more categories to associate with the identifier and provide the one or more categories to the first server, else provide the one or more categories that were previously associated with the identifier.

35. The system of claim 34, wherein the first server is a filter system.

36. The system of claim 34, wherein the second server is a database factory.

37. The system of claim 34 further comprising a gateway configured to receive the identifier and to allow or deny the user access to the website/page associated with the identifier.

38. The system of claim 37, wherein the gateway comprises:
a firewall module configured to provide an electronic boundary between the computer and an Internet; and
a router module configured to determine a path from the firewall module to the Internet website/page associated with the identifier.

* * * * *